March 24, 1942.    W. AUER    2,277,198
SHIFTING MECHANISM FOR CHANGE GEARING
Filed June 19, 1939    2 Sheets-Sheet 1
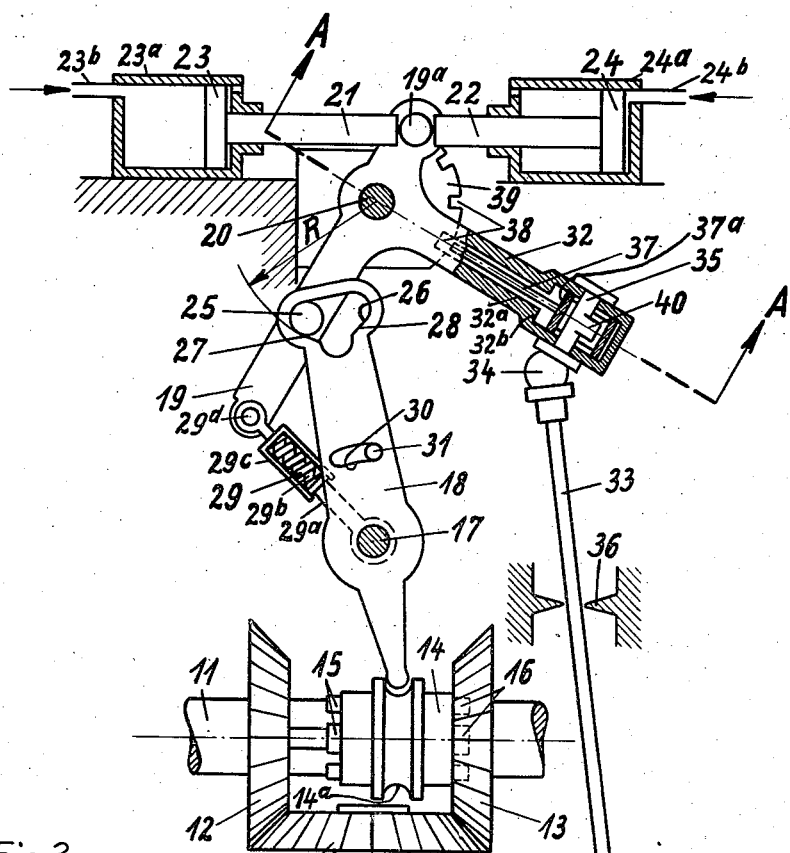
Fig. 1
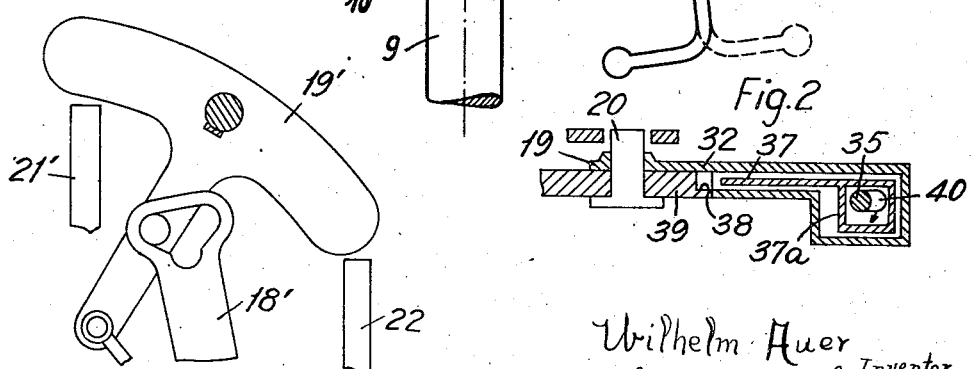
Fig. 3
Fig. 2
Wilhelm Auer, Inventor
Taulmin & Taulmin
Attorneys March 24, 1942.  W. AUER  2,277,198
SHIFTING MECHANISM FOR CHANGE GEARING
Filed June 19, 1939  2 Sheets-Sheet 2

Wilhelm Auer, Inventor
Taulmin & Taulmin
Attorneys

Patented Mar. 24, 1942

2,277,198

UNITED STATES PATENT OFFICE 2,277,198

SHIFTING MECHANISM FOR CHANGE GEARING

Wilhelm Auer, Heidenheim, Brenz, Germany

Application June 19, 1939, Serial No. 280,011
In Germany June 22, 1938

12 Claims. (Cl. 74—473)

This invention relates to change gearing and in particular to devices for shifting such change gearing.

One object of this invention is to provide mechanism for shifting change gearing to either of two end positions and at the same time to prevent the accidental shifting of the gearing.

Another object is to provide a device for shifting change gearing having a slidable shifting member wherein the shifting member is shifted to and fro by means of a lever having mechanism associated therewith so constructed and arranged as to hold the lever securely in its end positions and to prevent an accidental shifting of the shifting member by reason of the fact that any tendency to shift the shifting member operates to set up a component of force which acts in opposition to the shifting of the lever.

Another object is to provide a change gearing having a shifting device, the clutch member or shifting member being moved to and fro by a lever having a heart-shaped recess or aperture in the opposite end thereof, this aperture or recess being engaged by means mounted on a control lever actuated either automatically by pistons or manually in such a manner that the engagement of the mechanism prevents the accidental shifting of the shifting lever except by the intended actuation of the control lever.

Another object is to provide a change gearing with a shifting device as set forth above wherein a manually operated locking device is provided for locking the apparatus selectively in its end positions or in an intermediate neutral position wherein the driving connection is broken so that no power is transmitted from the drive shaft to the driven shaft.

In the drawings,

Figure 1 is a diagrammatic view partly in section showing a preferred embodiment of the change gearing and shifting device of this invention.

Figure 2:
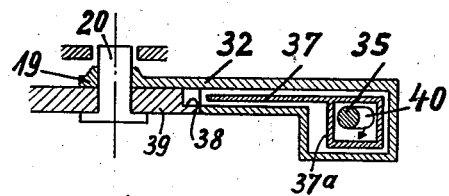
Figure 2 is a longitudinal section taken along the line A—A in Figure 1.

Referring to the drawings in detail, Figure 1 shows the change gearing of this invention as embodied in reverse gearing. The drive shaft 9 is connected to a prime mover such as a motor (not shown) and carries a bevel gear 10 meshing with similar bevel gears 12 and 13 loosely mounted upon the driven shaft 11. Keyed or splined to the driven shaft 11 so as to be slidable therealong is a gear shift member 14 having on its opposite ends clutch teeth 15 and 16 engageable with corresponding recesses in the bevel gears 12 or 13. In this manner when the gear shift member 14 is shifted to either of its extreme or end positions a driving connection is established between the drive shaft 9 and the driven shaft 11 through the bevel gear 10 and one of the loosely mounted bevel gears 12 or 13.

The gear shift member 14 is provided with an annular groove 14a which is engaged by one end of the gear shift lever 18 which is mounted upon the pivot shaft 17. The latter is in turn suitably supported by the frame of the machine.

Associated with the gear shift lever 18 and serving to actuate the latter is a control lever 19 mounted upon the pivot shaft 20 which in turn is also suitably mounted upon the frame of the machine. The control lever 19 at one end carries a pin 19a which is engaged by the ends of the piston rods 21 and 22 connected to the pressure operated pistons 23 and 24 reciprocable in the cylinders 23a and 24a by means of pressure fluid admitted thereto through the conduits 23b and 24b, respectively.

Mounted on the control lever 19 is a pin 25 which engages a cut-away portion 26 of approximately triangular or heart-shaped form and is located at the opposite end of the gear shift lever 18 from the end which engages the gear shift member 14. The engagement of the pin 25 with the cut-away portion 26 is such that in one end position the pin 25 lies in the left corner of the cut-away portion 26 and in the other end position it lies in the right corner thereof. Between these end positions the pin 25 slides relatively to the two sides 27 and 28 which are formed by arcs having the radius R. This radius is struck from the center of the pivot shaft 20 and has a length equal to the distance between the centers of the shaft 20 and pin 25 plus the radius of the pin 25.

The gear shift lever 18 and control lever 19 are yieldingly interconnected by a spring device generally designated 29 and consisting of a plunger 29a pivotally mounted upon the pivot shaft 17 and engaging a coil spring 29b within a cylinder 29c mounted upon the pivot pin 29d which in turn is mounted upon one end of the control lever 19. This spring device 29 thus tends to urge the control lever 19 into one or another of its end positions with the pin 25 coming to rest in the right hand or left hand corner of the cut-away portion 26.

In order to prevent the pressure pistons 23 and 24 from exerting a pressure against the bevel gears 12 or 13 through the intermediate mechanism, the gear shift lever 18 is provided with an arcuate slot 30 engaged by a stop pin 31 fixedly mounted upon any suitable portion of the frame of the machine. This stop pin 31 thus co-acts with the ends of the arcuate slot 30 to limit the swinging of the gear shift lever 18 to an amount just sufficient to engage the teeth 15 or 16 of the gear shift member 14 with the corresponding recesses in the loosely mounted bevel gears 12 or 13 yet without exerting any end thrust upon the latter.

The control lever 19 is additionally provided with an arm 32 in which a shaft 35 is pivotally mounted and connected with the universal joint 34 to the operating rod 33. The operating rod 33 is limited in its motion by the annular knife edge bearing 36 so that the shaft 35 may be rotated manually by means of the operating rod 33 regardless of the positions which the control lever 19 and its arm 32 may occupy at the moment. By this arrangement also the control lever 19 may be manually shifted by operating the rod 33 manually in the event of a failure of the pressure fluid employed for operating the pistons 23 and 24. The arm 32 is provided with a longitudinal bore 32a in which a stop rod 37 is slidably mounted. The stop rod 37 carries a hollow enlargement 37a (Figure 2) reciprocable in the enlarged bore 32b. The opposite end of the stop rod 37 is engageable with corresponding slots or notches 38 arranged at suitable intervals in a quadrant 39 fixedly mounted upon any suitable part of the machine. By the notches 38 and stop pin 37 the control lever 19 may be locked in its extreme end positions for "forward" or "rearward" movement of the apparatus or driven shaft 11 as well as in a middle or neutral position wherein no power will be transmitted from the drive shaft 9 to the driven shaft 11. Thus in the event that the apparatus is employed in a vehicle the locking of the mechanism in the middle position enables the vehicle to be towed by an additional power operated vehicle or locomotive in the event that a breakdown of the engine or driving motor occurs in the first mentioned vehicle.

Mounted upon the shaft 35 is an arm 40 which engages the inner walls of the hollow enlargement 37a in such a manner that when the shaft 35 is rotated by turning the rod 33 from its solid line to its dotted position or vice versa, the arm 40 shifts the stop rod 37 in one direction or the other so as to move into or out of the notches 38 in the quadrant 39. This locking or releasing action is accomplished with but a half revolution of the shaft 35. In the operation of the shifting mechanism the stop rod 37 is shifted into its unlocking position by rotating the shaft 35 by the manually operated rod 33. The control lever 19 may then be shifted manually by pushing the rod 33 longitudinally so that it swings the arm 32 around the pivot shaft 20. The control lever 19 and its pin 25 then swing through an arcuate path from one corner to the other corner of the heart-shaped or triangular cut-away portion 26 thereafter shifting the gear shift lever 18 and correspondingly moving the gear shift member 14 from one end position to the other.

The spring device 29 comes into operation to urge the control lever 19 and its pin 25 into the previously mentioned corners of the cut-away portion 26.

This manual operation, however, is ordinarily employed only in an emergency. Usually the control lever 19 is shifted by admitting pressure fluid to one or the other of the cylinders 23a or 24a thereby moving the pistons 23 or 24 against the pin 19a and shifting the control lever 19 from one end portion to the other. This motion is communicated by the pin 25 acting against the corners or ends of the heart-shaped cut-away portion 26 to the gear shift lever 18 and thereby to the gear shift member 14. Thus for a given direction of rotation of the drive shaft 9 the direction of rotation of the driven shaft 11 can be quickly and easily reversed. At the same time the accidental and unintended shifting of the member 14 and lever 18 are prevented even though a longitudinal force is exerted upon the gear shift member 14.

As previously stated the pin 31 acting in the arcuate slot 30 limits the motion of the lever 18 and gear shift member 14. The longitudinal section shown in Figure 2 illustrates more clearly the arrangement of the stop rod 37 and its actuation by the arm 40 engaging the hollow enlargement 37a.

Figure 3:
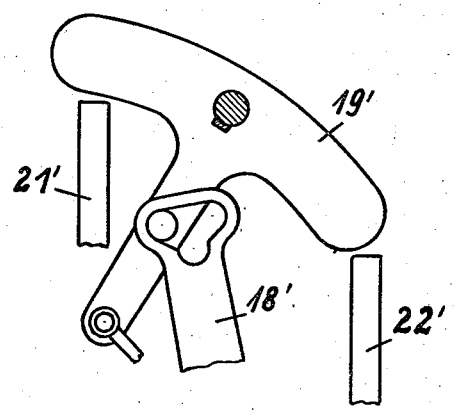
Figure 3 is a fragmentary view of a modification of a portion of the mechanism shown in Figure 1.

In the modification shown in Figure 3 the shape of the control lever 19' is altered so that it becomes T-shaped. The piston rods 21' and 22' are also arranged to reciprocate in parallel directions rather than in the same direction as in Figure 1. The direction of reciprocation of the piston rods 21' and 22' is thus also parallel to the center line of the two levers 18' and 19' when they are in their mid positions. This modified construction of Figure 3 is especially valuable in vehicle installations because it gives a compact arrangement which is well adapted to the very small space available in such vehicles for the gear shifting mechanism.

It will be understood that I desire to comprehend within my invention such modifications as come within the scope of the claims and the invention.

Having thus fully described my invention, what I claim as new and desire to secure by Letters Patent is:

1. In a shifting mechanism for controlling the shifting of change gearing, a gear shift member, a shift lever engaging said shift member and having a cut-away portion therein, a control lever swingable about a pivot and having means for engaging said cut-away portion, and means for swinging said control lever, said cut-away portion having an approximately heart-shaped outline with two oppositely inclined surfaces, and said control lever means comprising a pin adapted alternately to engage said oppositely inclined surfaces of said cut-away portion to lock the shift lever, the arcuate portions of said heart-shaped cut-away portion having radii equal to the distance between the center of said pin and the pivot axis of said control lever plus the radius of said pin.

2. In a shifting mechanism for controlling the shifting of the shift member of change gearing, a shift lever engaging said shift member and having a cut-away portion therein with two oppositely inclined locking surfaces, a control lever having a locking element for selectively engaging one or the other of said inclined surfaces to lock said shift member in its respective position, said levers being arranged to swing relatively to each other through a mid position in which they are aligned substantially with the center line connecting the pivots of said levers, and means for swinging said control lever from one locking position into another locking position and vice versa, a recess being provided in said cut-away portion intermediate said locking surfaces adapted temporarily to be entered by said locking element while said control lever is being moved from one locking surface to the other locking surface, thereby conveying the movement of said control lever to said shift lever for actuation of the latter.

3. In a shifting mechanism for controlling the shifting of the shift member of change gearing, a pivot member, a shift lever thereon engaging said shift member and having near one end thereof an approximately heart-shaped cut-away portion with two oppositely inclined surfaces, a second pivot member, a control lever thereon having a pin connected with said control lever and adapted selectively to engage one of said inclined surfaces, and abutment means for limiting the swinging of one of said levers.

4. In a shifting mechanism for controlling the shifting of change gearing, a shift member, a shift lever engaging said shift member and having a cut-away portion therein with two oppositely inclined locking surfaces, a control lever having means for selectively engaging one of said locking surfaces, and yielding means operatively interconnecting said levers.

5. In a shifting mechanism for controlling the shifting of the shift member of change gearing, a pivot member, a shift lever thereon engaging said shift member and having an approximately heart-shaped cut-away portion near one end thereof, a second pivot member, a control lever thereon having a pin engaging the edges of said cut-away portion, and yielding means pivotally attached to and operatively interconnecting said levers.

6. In a shifting mechanism for controlling the shifting of the shift member of change gearing, a shift lever engaging said shift member and having a cut-away portion with two oppositely inclined locking surfaces, a control lever having means for selectively engaging one of said inclined surfaces, fluid operable means for shifting said control lever, and auxiliary manually-operable means adapted likewise to actuate said control lever.

7. In a shifting mechanism for controlling the shifting of the shift member of change gearing, a shift lever engaging said shift member and having a cut-away portion therein with two oppositely inclined surfaces, a control lever having means for selectively engaging one of said inclined surfaces to lock the shift member in its respective position, a manually operable rod, a universal joint connecting said operating rod to said control lever so as to allow manual shifting operation of said control lever, and fluid operable means adapted independently of said manually operable rod to effect a shifting movement of said control lever.

8. In a shifting mechanism for controlling the shifting of the shift member of change gearing, a shift lever engaging said shift member and having a cut-away portion therein with two oppositely inclined surfaces, a control lever having means for selectively engaging said inclined surfaces, means for locking said control lever in its respective position, a manual operating rod, and a universal joint connecting said operating rod to said control lever and to said locking means.

9. In a shifting mechanism for controlling the shifting of the shift member of change gearing, a shift lever engaging said shift member and having a cut-away portion therein with oppositely inclined curved surfaces, a control lever having locking means for selectively engaging one of said inclined surfaces and being shiftable about a point constituting the center of curvature of the respective locking surface during its engagement by said locking means, and means for swinging said control lever, said control lever being T-shaped and said swinging means comprising pistons engaging said T-shaped lever and reciprocable in parallel directions.

10. In a shifting mechanism for controlling the shifting of change gearing, a gear shift member, a first pivot, a shift lever engaging said gear shift member and adapted to swing about said first pivot for actuating said gear shift member, said shift lever being provided with a heart-shaped cut-away portion having two inclined locking surfaces, a second pivot, a control lever shiftable about said second pivot for actuating said shift lever, and a cylindrical stud connected with said control lever and adapted alternately to engage one of said inclined surfaces of said shift lever for locking the same, the radius of said stud equalling the maximum change in distance between the axis of the said stud and the axis of said first pivot as said change occurs during the shift of said stud from one locking surface to the other locking surface.

11. In a shifting mechanism for controlling the shifting of change gearing, a gear shift member, a shift lever engaging said gear shift member and adapted to shift the same, said shift lever being provided with a cut-away portion having two inclined locking surfaces separated from each other by a semi-circular recess; and a control lever shiftable about a pivot and carrying a cylindrical stud adapted alternately to engage one of said surfaces for locking said shift member and also adapted, during the shifting of said control lever, temporarily to enter said recess for conveying the movement of said control lever to said shift lever for actuating the latter, the radius of said semi-circular recess equalling half the diameter of said stud.

12. In a shifting mechanism for controlling the shifting of the shift member of change gearing, a pivot member, a shift lever thereon engaging said shift member and having near one end thereof an approximately heart-shaped cut-away portion with two oppositely inclined surfaces separated from each other by a recess, a second pivot member, and a control lever thereon having a pin connected with said control lever and adapted selectively to engage one of said inclined surfaces for establishing a locking engagement between said shift lever and said control lever, said pin being restricted in its movement by the side portions of said cut-away portion and being adapted to enter said recess when moved from one inclined surface to the other inclined surface for imparting a shifting movement upon said shift member.

WILHELM AUER.